(12) United States Patent
Teglia et al.

(10) Patent No.: US 8,161,293 B2
(45) Date of Patent: Apr. 17, 2012

(54) PROTECTION OF THE EXECUTION OF A PROGRAM EXECUTED BY AN INTEGRATED CIRCUIT

(75) Inventors: Yannick Teglia, Marseilles (FR); Pierre-Yvan Liardet, Peynier (FR); Alain Pomet, Rousset (FR)

(73) Assignee: STMicroelectronics S.A., Montrouge (FR)

( * ) Notice: Subject to any disclaimer, the term of this patent is extended or adjusted under 35 U.S.C. 154(b) by 1243 days.

(21) Appl. No.: 11/640,450

(22) Filed: Dec. 15, 2006
(Under 37 CFR 1.47)

(65) Prior Publication Data

US 2007/0180319 A1 Aug. 2, 2007

Related U.S. Application Data

(63) Continuation of application No. 11/407,382, filed on Apr. 18, 2006, now abandoned.

(30) Foreign Application Priority Data

Apr. 20, 2005 (FR) ..................... 05 51006

(51) Int. Cl.
*G06F 11/30* (2006.01)
*G06F 11/00* (2006.01)
*G06F 9/44* (2006.01)

(52) U.S. Cl. .......... 713/189; 713/187; 713/188; 726/22; 717/127; 717/128; 714/21

(58) Field of Classification Search .................. 713/165, 713/167, 187–188; 726/22–24, 26, 27, 30; 380/1; 703/19, 22; 714/1, 21, 33, 37–39; 717/124–129, 131
See application file for complete search history.

(56) References Cited

U.S. PATENT DOCUMENTS

| 6,738,932 | B1 * | 5/2004 | Price .............................. 714/38 |
| 7,168,065 | B1 * | 1/2007 | Naccache et al. ............. 717/127 |
| 7,984,304 | B1 * | 7/2011 | Waldspurger et al. ........ 713/187 |
| 2003/0023856 | A1 * | 1/2003 | Horne et al. .................. 713/187 |
| 2003/0182570 | A1 * | 9/2003 | Dellow ........................ 713/194 |
| 2003/0188231 | A1 * | 10/2003 | Cronce .......................... 714/52 |
| 2005/0172196 | A1 * | 8/2005 | Osecky et al. ................ 714/746 |
| 2005/0229164 | A1 * | 10/2005 | Giraud ........................ 717/130 |
| 2005/0289411 | A1 * | 12/2005 | Van Assche .................. 714/718 |
| 2006/0179483 | A1 * | 8/2006 | Rozas ............................. 726/22 |
| 2007/0106519 | A1 * | 5/2007 | Giraud et al. ..................... 705/1 |

FOREIGN PATENT DOCUMENTS

| FR | 2 849 226 A1 | 6/2004 |
| JP | 2002-539523 A | * 11/2002 |
| WO | WO 00/54155 A1 | 9/2000 |

OTHER PUBLICATIONS

French Search Report from corresponding French Application No. 05/51006, filed Apr. 20, 2006.

* cited by examiner

*Primary Examiner* — Edward Zee
*Assistant Examiner* — Darren B Schwartz
(74) *Attorney, Agent, or Firm* — Wolf, Greenfield & Sacks, P.C.

(57) ABSTRACT

A method and a circuit for protecting the execution of a program, including initializing at least one counter, carrying on with the normal program execution, interrupting this execution when the counter reaches a given value, and executing at least one integrity check of the calculation after this interrupt.

18 Claims, 1 Drawing Sheet

PROTECTION OF THE EXECUTION OF A PROGRAM EXECUTED BY AN INTEGRATED CIRCUIT

CROSS REFERENCE TO RELATED APPLICATIONS

This application is a continuation of U.S. application Ser. No. 11/407,382, filed Apr. 18, 2006 entitled PROTECTION OF THE EXECUTION OF A PROGRAM EXECUTED BY AN INTEGRATED CIRCUIT, which application is incorporated herein by reference in its entirety.

BACKGROUND OF THE INVENTION

1. Field of the Invention

The present invention generally relates to electronic circuits and, more specifically, to the protection of data contained in an integrated circuit against an extraction thereof after fault injections in the circuit operation. The present invention more specifically relates to the protection against a possible attempt to disturb a calculation handling data that should not be communicated outside the circuit.

2. Discussion of the Related Art

FIG. 1 is a schematic block diagram illustrating an example of a simplified architecture of an integrated circuit 1, for example a smart card, of the type to which the present invention applies. Circuit 1 comprises a central processing unit 11 (CPU) associated with one or several memories 12 (MEM) among which generally at least one element for storing in non-volatile fashion a digital amount (for example, a confidential code) and an input/output circuit (I/O) enabling data exchange with the outside of circuit 13. The different elements communicate via several internal data, address, and control buses 14.

Among possible attacks performed by persons attempting to fraudulently obtain confidential data from chip 1, the present invention applies to so-called fault-injection attacks which consist of disturbing the operation of component 1, for example, by means of radiation (laser, infrared, X-rays, etc.) or by other means (for example, by acting on the component supply).

The data provided (output) by the component on its input/output ports 13 are exploited by the person attempting fraud to discover secret elements of the chip (algorithm, secret key, etc.) or to elude a security mechanism (authentication, identification, ciphering, etc.).

Some integrated circuits comprise tools for detecting fraud attempts by checking that a program has properly executed. For example, the same instructions of a calculation are executed twice and it is checked that they lead to the same result, or a signature calculation is performed on data extracted from memory 12. In case a fraud attempt is detected, the component is generally off, that is, it does not provide the required result on its input/output ports 13.

FIG. 2 schematically shows an example of sequencing of a calculation with an integrity check of the type to which the present invention applies. This sequencing may correspond to a portion of a program executed by a smart card and only the portion subject to an integrity check, that is, a checking of the absence of errors on the calculation having involved the critical digital quantity, will be discussed.

It is generally desired to check the calculation (be it by double execution or by a signature calculation) before outputting the result from circuit 1. This means that an execution (block 21, COMPUT) of the calculation, the integrity of which is desired to be checked, is followed in time with a checking (block 22, CHECK) before allowing the carrying on of the program flow (block 23, FLOW) and especially the provision of a result to the outside of the circuit.

The object of checking 22 is to detect a possible disturbance by fault injection on execution of calculation 21.

A problem is that if a person attempting fraud knows how to disturb (derail) a calculation, he also knows a priori how to disturb checking 22 of this calculation. In particular, if this disturbance consists of forcing a jump of the program in the flow thereof, there is a risk for the integrity check not to be brought to its end, without this preventing the program from carrying on, and thus the output of a result.

A conventional solution to attempt solving this problem is illustrated in FIG. 2. It consists of spacing calculation 21 in time from its integrity check 22 by interposing, between the two (block 24, WAIT), either false operations, or a wait loop, that is, a wait sequence between the execution of the calculation and its checking.

A disadvantage of such a solution is that the introduction of such a wait sequence 24 adversely affects the general speed of execution of the programs in the integrated circuit.

Another disadvantage is that, to be effective, wait sequence 24 must be relatively long to guarantee that a second attack intended to disturb checking 22 actually falls in wait sequence 24.

Another disadvantage is that wait sequence 24 may itself be disturbed by a fault injection, which then risks enabling the program to start back off in its normal flow (block 23).

SUMMARY OF THE INVENTION

The present invention aims at overcoming all or part of the disadvantages of known methods and systems for checking the integrity of calculations executed by an integrated circuit.

The present invention more specifically aims at avoiding use of wait time sequences to space the execution of a calculation to be protected from its integrity check.

The present invention also aims at providing a solution requiring no structural modification of the integrated circuits executing algorithms involving digital quantities to be protected.

The present invention also aims at providing a versatile and adaptable solution, whatever the type of executed calculation.

To achieve all or part of these objects, as well as others, the present invention provides a method for protecting the execution of a program by checking the integrity of a calculation executed by an integrated circuit, comprising:

initializing at least one counter;

carrying on with the program execution;

interrupting this normal execution when the counter reaches a given value; and executing at least one integrity check of the calculation after this interrupt.

According to an embodiment of the present invention, said given value is randomly selected from a range of values.

According to an embodiment of the present invention, an upper limit of said range is selected according to the normal execution of the program so that no instruction prejudicial from the point of view of data security occurs before the integrity check of the calculation can be executed.

According to an embodiment of the present invention, a lower limit of said range is selected to result in a time longer than the time required for the integrity check.

According to an embodiment of the present invention, said counter is a time counter.

According to an embodiment of the present invention, said counter is an instruction counter.

According to an embodiment of the present invention, said counter is a counter of a signal available in the integrated circuit in relation with the calculation time.

According to an embodiment of the present invention, several integrity checks are performed on intermediary results of the calculation with, each time, initializations of the counter to different values.

The present invention also provides an integrated circuit comprising at least a central processing unit, a memory, an input/output circuit, and means for implementing the protection method.

The present invention also provides a smart card comprising such a circuit.

The foregoing and other objects, features, and advantages of the present invention will be discussed in detail in the following non-limiting description of specific embodiments in connection with the accompanying drawings.

DETAILED DESCRIPTION

Figure 1:
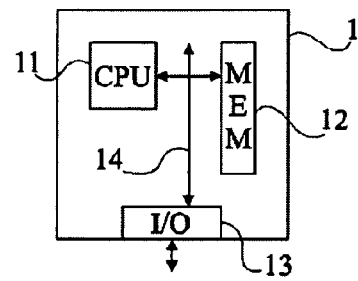
FIG. 1, previously described, partially and schematically shows an example of an integrated circuit of the type to which the present invention applies.

The same elements have been designated with the same reference numerals in the different drawings. For clarity, only those method steps and circuit elements which are useful to the understanding of the present invention have been shown in the drawings and will be described hereafter. In particular, the details constitutive of the calculations, the integrity of which is desired to be checked have not been discussed, the present invention being compatible with any conventional digital quantity handling algorithm. Further, the actual integrity check programs, be they multiple calculations, signature calculations, or others have not been described in detail since the present invention is compatible with any conventional integrity check mechanism.

A feature of an embodiment of the present invention is to replace the initial steps performed in the wait sequence between the integrity check and the actual calculation (block 24, FIG. 2) with steps of the normal program flow, subsequent to the calculation to be protected.

Another feature of an embodiment of the present invention is to interrupt this normal flow of the program at at least one time, randomly selected, to check the integrity (at least partially) of the calculation.

Figure 2:
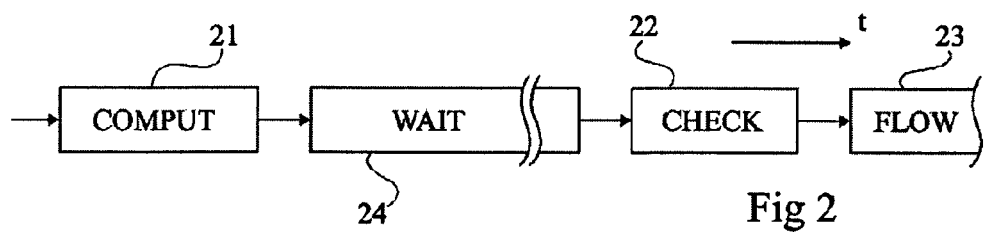
FIG. 2 illustrates a conventional example of the flow of an integrity check program of the type to which the present invention applies.
Figure 3:
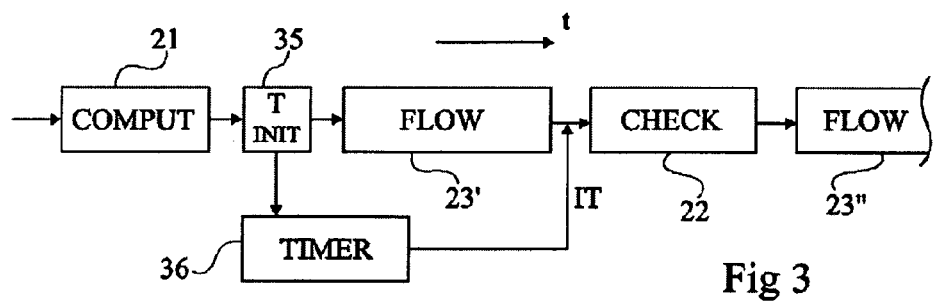
FIG. 3 schematically illustrates in the form of blocks a first embodiment of a method for protecting the flow of a program according to the present invention.

FIG. 3 very schematically illustrates in the form of blocks, in a view to be compared with that of FIG. 2, a first embodiment of the present invention. This drawing shows the time flow of a program implementing a calculation to be protected.

As previously, at a time of the program flow, said program executes (block 21, COMPUT) a calculation, the integrity of which is desired to be checked.

According to this embodiment of the present invention, at the end of the calculation, the program initializes (block 35, T INIT) a counter 36 (TIMER). This counter is, for example, a time counter generally available in any central processing unit (block 11, FIG. 1). It may also be a counter of instructions or of any available signal (for example, the state of a variable) likely to be put in relation with the execution time of the calculation. Counter 36 is used to generate, at the end of its counting, preferably randomly selected from a determined range, an interrupt (IT).

This interrupt is, according to this embodiment of the present invention, taken advantage of to interrupt the flow (block 23', FLOW) of the program which has carried on normally after initialization 35 of the counter.

An integrity check calculation (block 22, CHECK) conventional per se is executed by the central processing unit after interrupt IT.

Once the integrity check has been performed, the program flow (block 23', FLOW) carries on unless implementing, if need be, the required steps (circuit blocking, memory clearing, etc.) in case of a lack of integrity.

According to a preferred embodiment of the present invention, counter 36 is initialized to count or count down a time interval, randomly selected between two values which are selected according to the normal program steps likely to execute (block 23') before the integrity check. These values are selected to prevent a prejudicial action from the point of view of security from intervening before the integrity check can be performed.

The minimum limit for example corresponds to the minimum duration required to separate a calculation from its integrity check so that the delay is sufficient to avoid having a second disturbance cause a problem with the integrity check. For example, this minimum time corresponds to the maximum duration of the integrity check program.

The maximum limit is preferably selected according to instructions 23 of the program which follow the calculation to be protected so that interrupt IT intervenes before output of a result from the circuit.

Figure 4:
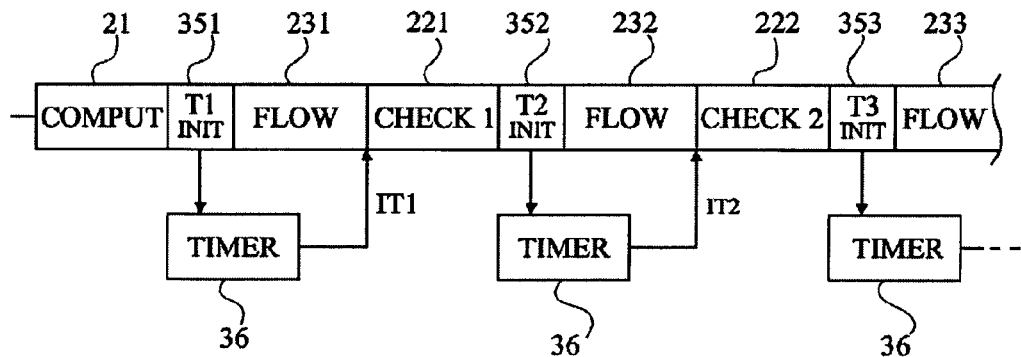
FIG. 4 schematically illustrates in the form of blocks a second embodiment of a method for protecting the flow of a program according to the present invention.

FIG. 4 very schematically illustrates in the form of blocks a second embodiment of the present invention. This drawing shows the time flow of a program implementing a calculation to be protected.

As compared with the embodiment of FIG. 3, the integrity control comprises several checks 221 (CHECK1), 222 (CHECK2), etc. triggered by successive interrupts IT1, IT2, etc. which follow successive initializations 351 (T1 INIT), 352 (T2 INIT), 353 (T3 INIT), etc. of counter 36 (or of separate counters). The program flow carries on (blocks FLOW 231, 232, 233) between each check. Each counting duration (or number of instructions) T1, T2, T3 is randomly selected. Such an embodiment more specifically applies to checks of intermediary results of a calculation.

An advantage of the present invention is that it reduces or minimizes the time loss linked to the integrity check and, more specifically, to the time separation between the integrity check and the calculation to be checked. The only time cost generated by the present invention corresponds to the interrupt management, which is in practice negligible as compared with the duration of an integrity check.

Another advantage of the present invention is that it respects the random character of the time separation between the calculation to be checked and the integrity check.

Another advantage of the present invention is that it is easy to implement by exploiting the central processing unit usually present to perform the involved calculation.

According to an alternative embodiment, counter 36 is initialized during the main calculation (block 21).

According to another variation, counter 36 is initialized at the beginning of the calculation to be protected. According to a preferred embodiment of this alternative, the lower limit of the counter is then selected according to the content of the calculation to be checked, to be longer than the execution time of a given number of instructions of the algorithm (for example, a number of turns of a DES-type algorithm).

An advantage then is that, according to the time when the interrupt occurs, one or the other of the partial results is checked. Information about the time of the interrupt as well as a possibility to provide several interrupts are available (FIG. 4).

Another advantage is that this also protects from a program trap by imposing a first check close to the beginning of the algorithm.

Of course, the present invention is likely to have various alterations, improvements, and modifications which will readily occur to those skilled in the art. In particular, although the present invention has been described in relation with an integrated circuit of smart card type, it more generally applies to a calculation integrity check aiming at protecting a desired secret digital quantity from a possible reading by a person attempting fraud.

Further, the practical implementation of the present invention is within the abilities of those skilled in the art based on the functional indications given hereabove and by using conventional tools. In particular, the selection of the range of durations (or of numbers of instructions) according to the calculation to be protected, as well as the initialization time (before, during, or after the calculation) are within the abilities of those skilled in the art according to the application.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting the execution of a program by checking the integrity of a calculation executed by an integrated circuit, comprising:
    executing, by a processor of the integrated circuit, a program to perform a calculation;
    initializing, by the processor of the integrated circuit, at least one counter;
    carrying on, by the processor of the integrated circuit, with the program execution during operation of the counter;
    interrupting, by the integrated circuit, the program execution when the counter reaches a given value randomly selected from a range of values wherein an upper limit of said range is selected according to the program execution where no instruction prejudicial to data security occurs before the integrity check of the calculation executed; and
    executing, by the processor of the integrated circuit, at least one integrity check of the calculation in response to this interrupt.

2. The method of claim 1, wherein a lower limit of said range is selected to result in a time longer than a time required for the integrity check.

3. The method of claim 1, wherein said counter is a time counter.

4. The method of claim 1, wherein said counter is an instruction counter.

5. The method of claim 1, wherein said counter is a counter of a signal available in the integrated circuit in relation with the calculation time.

6. The method of claim 1, wherein several integrity checks are performed on intermediary results of the calculation with, each time, initializations of the counter to different values.

7. An integrated circuit comprising at least a central processing unit, a memory, an input/output circuit, and comprising means for implementing the protection method of claim 1.

8. A smart card, comprising the circuit of claim 7.

9. A method for protecting the execution of a computer program by an integrated circuit, comprising:
    executing, by a processor of the integrated circuit, a program to perform a calculation;
    proceeding, by the processor of the integrated circuit, with program execution following completion of the calculation;
    interrupting, by the integrated circuit, program execution following completion of the calculation at an interrupt time randomly selected from a range of interrupt times wherein an upper limit of said range is selected to prevent execution of an instruction prejudicial to data security before the integrity check is executed;
    executing, by the processor of the integrated circuit, at least one integrity check of the calculation in response to interrupting program execution; and
    continuing, by the processor of the integrated circuit, program execution following the integrity check unless the integrity check indicates a lack of integrity.

10. A method as defined in claim 9, further comprising determining the randomly selected interrupt time with at least one counter.

11. A method as defined in claim 9, wherein a lower limit of said range is selected to be longer than a time required for the integrity check.

12. A method as defined in claim 9, further comprising initializing at least one counter, wherein the program execution is interrupted when the counter reaches the randomly selected interrupt time.

13. A method as defined in claim 9, wherein the acts of interrupting program execution, executing at least one integrity check and continuing program execution are performed two or more times.

14. A method as defined in claim 13, wherein a different randomly selected interrupt time is used for each interruption of program execution.

15. An integrated circuit comprising:
    a memory;
    an input/output circuit; and
    a central processing unit configured to protect execution of a computer program stored in the memory by:
    executing the program to perform a calculation;
    proceeding with program execution following completion of the calculation;
    interrupting program executing following completion of the calculation at an interrupt time randomly selected from a range of interrupt times wherein an upper limit of said range is selected to prevent execution of an instruction prejudicial from the point of view of data security before the integrity check is executed;
    executing at least one integrity check of the calculation in response to interrupting program execution; and
    continuing program execution following the integrity check unless the integrity check indicates a lack of integrity.

16. An integrated circuit as defined in claim 15, wherein the central processing unit is configured to determine the randomly selected interrupt time with at least one counter.

17. An integrated circuit as defined in claim 15, wherein a lower limit of said range is selected to be longer than the time required for the integrity check.

18. An integrated circuit as defined in claim 15, wherein the central processing unit is configured to execute two or more integrity checks at different randomly selected interrupt times.

* * * * *

UNITED STATES PATENT AND TRADEMARK OFFICE
CERTIFICATE OF CORRECTION

PATENT NO.        : 8,161,293 B2
APPLICATION NO.   : 11/640450
DATED             : April 17, 2012
INVENTOR(S)       : Yannick Teglia et al.

It is certified that error appears in the above-identified patent and that said Letters Patent is hereby corrected as shown below:

Column 6, line 54, should read:
interrupting program execution following completion of Signed and Sealed this
Twenty-ninth Day of May, 2012

David J. Kappos
*Director of the United States Patent and Trademark Office*